United States Patent
Lehman

[11] Patent Number: 6,097,144
[45] Date of Patent: Aug. 1, 2000

[54] CATHODE RAY TUBES HAVING REDUCED GLASS BROWNING PROPERTIES

[75] Inventor: Richard L. Lehman, South Brunswick, N.J.

[73] Assignee: International Lead Zinc Research Organization, Inc., Research Triangle Park, N.C.

[21] Appl. No.: 09/181,378

[22] Filed: Oct. 28, 1998

[51] Int. Cl.[7] .............................. H01J 29/10; H01J 31/00
[52] U.S. Cl. .................... 313/461; 313/473; 313/479; 313/480; 252/478
[58] Field of Search ................... 313/461, 473, 313/477 R, 479, 480; 252/478; 501/69, 70

[56] References Cited

U.S. PATENT DOCUMENTS

| | | | |
|---|---|---|---|
| 3,725,710 | 4/1973 | De Gier et al. | 313/461 |
| 4,331,770 | 5/1982 | Thompson | 501/62 |
| 4,337,410 | 6/1982 | Van Der Geer et al. | 313/480 |
| 4,520,115 | 5/1985 | Speit et al. | 501/60 |
| 4,599,319 | 7/1986 | Sack | 501/57 |
| 5,108,960 | 4/1992 | Boek et al. | 501/64 |
| 5,468,692 | 11/1995 | Boek et al. | 501/64 |

OTHER PUBLICATIONS

A. Rengan, T. Remec, Y. S. Park, Radiation Damage in CRT Glass, Proceedings of the Society for Information display, vol. 26/1, pp. 47–53, 1985.

A. Rengan, T. Remec, Y. S. Park, Radiation Damage in Projection CRT Glass, Society for information Display 1984 Digest, pp. 40–43.

M. Ishyma, J. Chiba, Y. Suzuki, Browning of Glass by Electron Bombardment, Proceedings of International Congress on Glass, 1974, Kyoto, pp. 5–1 to 5–8.

*Primary Examiner*—Nimeshkumar D. Patel
*Assistant Examiner*—Michael J. Smith
*Attorney, Agent, or Firm*—Baker Botts L.L.P.

[57] ABSTRACT

The present invention provides an inexpensive cathode ray tube envelope which suffers considerably diminished glass browning in comparison with traditional cathode ray tube envelopes. The method of reducing glass browning in cathode ray tubes, and a suitable glass composite and glass composition are also provided. The cathode ray tube envelope of the present invention includes a screen which has an inner and an outer glass layers. The inner layer is made of lead-free glass whereas the outer layer is made of lead-containing glass. In the operational cathode ray tube of the present invention, the electron beams emitted therein, are absorbed by the inner layer without substantial browning, since the inner layer does not contain material that cause browning, and do not penetrate to the lead-containing outer layer. At the same time, the X-rays produced in the cathode ray tube are effectively and efficiently blocked by the lead-containing outer layer. The result is both significant reduction in glass browning and effective X-ray protection.

16 Claims, 1 Drawing Sheet

CATHODE RAY TUBES HAVING REDUCED GLASS BROWNING PROPERTIES

BACKGROUND OF THE INVENTION

The present invention relates to cathode ray tubes (CRTs). A CRT is a device in which high-energy electron beams are projected in a vacuum onto a screen which contains a layer of a luminescent material. The direction and intensity of the electron beams in CRTs are controlled to produce visible images at a predetermined location at the screen. For general description of CRTs, their structure and use, see, for example, McGraw-Hill Encyclopedia of Science and Technology, vol. 2, pp 666–672 (5th edition, 1982), which is hereby incorporated by reference.

In the most general terms, a cathode ray tube comprises an envelope which serves as a vacuum enclosure; an electron gun, which is a source of the electron beams and which also includes means for controlling the direction of the electron beams, and a luminescent layer.

X-rays are also created inside CRTs when the electron beams bombard the surface of a material with high atomic weight, e.g. the glass screen of the envelope. For brief description of the X-ray formation and nature, see McGraw-Hill Encyclopedia of Science and Technology, vol. 14, pp 758–761 (5th edition, 1982), which is also hereby incorporated by reference. To contain the harmful X-rays inside a cathode ray tube, CRT envelopes typically are made of materials with good X-ray absorbing properties, such as, for example, lead-containing glass. Lead is a highly efficient X-ray absorber, and, therefore, it is very effective in containing the X-rays. However, an interaction between the lead-containing glass and the high-energy electron beams leads to molecular damage in the lead-containing glass in the area where the electron bombardment occurs. The damage manifests itself as a color change called glass browning. See, for example, Ishiyama et al., Browning of Glass by Electron Bombardment, Proceedings of Tenth International Congress on Glass (1974), also hereby incorporated by reference. The X-rays also contribute to glass browning, but their contribution is much smaller.

Since CRTs are widely used in televisions, computers, and various other numeric and imaging devices to create visible images, glass browning is a very serious problem for CRT users and producers. Browning destroys the true nature of colors displayed by CRTs and directly reduces the functionality of the CRT devices. Glass browning is especially detrimental to those CRT users who depend on true colors: art departments, photographers, graphic designers, desktop publishers, and others.

The glass browning problem has plagued the CRT industry for many years. The problem, however, became more pronounced as higher voltages are used in CRTs to enhance picture quality. Currently, the only alternative to coping with glass browning is the use of lead-free glass in the CRT envelopes. To provide satisfactory X-ray containment, large quantities of barium and strontium oxides are currently used in CRT envelopes. Barium and strontium oxides are much more expensive than lead oxide, and must be incorporated in higher concentrations vis-a-vis lead in order to provide comparable X-ray absorbing properties. Further increase in CRT voltage will strain capacity of existing lead-free CRT envelopes to contain X-rays. The use of a lead-containing glass is preferred due to the unique ability of lead to block X-rays and because it is economical. Moreover, well-developed processes for manufacturing lead-containing glass panels for CRTs are both available and inexpensive.

For the foregoing reasons, there is a definite and unfulfilled need for an inexpensive CRT envelope that absorbs X-rays and yet is not subject to glass browning.

SUMMARY OF THE INVENTION

The present invention satisfies this need by providing an inexpensive cathode ray tube envelope in which glass browning is substantially diminished. According to the present invention, at least the image-producing screen of the CRT envelope is comprised of two layers: an inner glass layer made of a suitable browning-resistant material, such as, for example lead-free glass, and an outer glass layer made of material with good X-ray absorbing properties, such as, for example, lead-containing glass. The lead-free inner layer includes the luminescent material, preferably in a layer deposited on the inner surface of the lead-free glass layer. The outer layer may be is a continuous part of the CRT envelope with the inner layer comprising a lead-free glass coating deposited thereon. Alternatively, the inner layer may be a continuous part of the envelope with the outer layer comprising the lead-containing glass coating deposited thereon.

This two layer construction effectively and efficiently blocks X-rays from exiting the CRT. The electron beam strikes the inner layer. The electrons are absorbed by this layer and do not penetrate to the lead-containing glass layer. Since the inner glass layer is lead-free, substantially no browning occurs in this layer.

The X-rays that are emitted due to the impact of the electrons on the lead-free inner layer are absorbed by the lead-containing outer layer. Since the electrons and not the X-rays are the main reason for glass browning, browning is substantially diminished. X-rays are substantially blocked from exiting the tube without resorting to excessive quantities of exotic and expensive materials.

A cathode ray tube according to the present invention, in addition to the envelope described above, comprises an electron gun, which is a source of electrons, and which also includes means for changing the direction of the electron beams.

The present invention is also directed to a method of preventing glass browning in cathode ray tubes, a glass composite and a glass composition of the lead-free glass layer suitable for use in the present invention.

It is an object of the present invention to provide a cathode ray tube envelope with a substantially longer useful life by reducing glass browning.

It is also an object of the present invention to provide a cathode ray tube envelope which may be economically and conveniently made from materials traditionally utilized in CRT manufacturing, such as, for example, lead-containing glass, while obtaining CRT with substantially longer useful life.

The objects of the present invention described herein are not intended in any way to limit the present invention.

These and other objects, features, aspects and advantages of the present invention will become better understood with reference to the following description, appended claims and accompanying drawings.

DETAILED DESCRIPTION OF THE INVENTION

Assemblage is herein defined as a two-layered structure formed after deposition of any glass material of the present invention prior and during heating and prior to melting of the deposited glass material and formation of the composite.

Composite is herein defined as a two-layered structure formed after deposition of any glass material of the present invention and after melting of the deposited glass material.

Frit is herein defined as a top layer of the assemblage comprising the deposited glass material.

Figure 2:
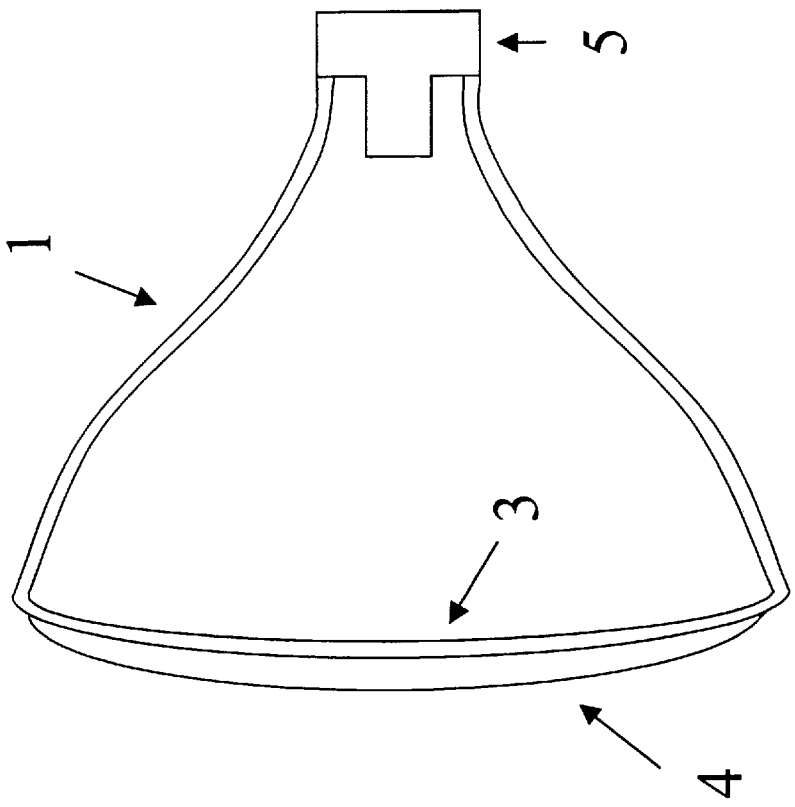
FIG. 2 shows another version of the present invention wherein the outer glass layer is deposited onto the inner glass layer.
Figure 1:
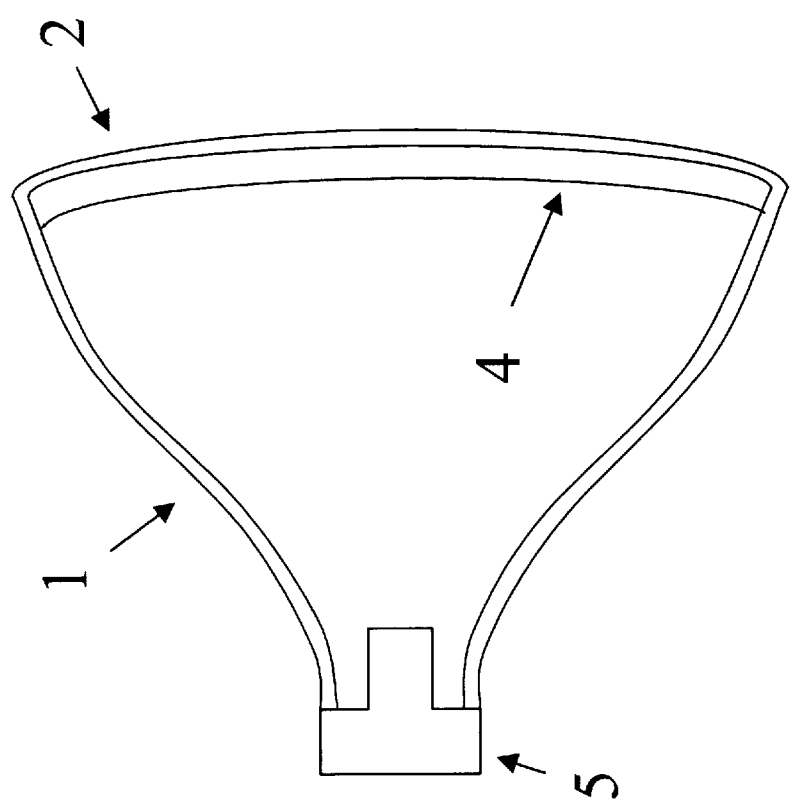
FIG. 1 shows one of the versions of the present invention wherein the inner glass layer is deposited onto the outer glass layer.

As shown in FIG. 1, the cathode ray tube envelope of the present invention comprises body 1 which includes screen 2. The screen 2 comprises two layers: an inner layer 3 made of material which resist browning, such as, for example, lead-free glass, and an outer layer 4 made of material with good x-ray absorbing properties. The outer layer 4 may be a continuous part of the envelope with the inner layer 3 being deposited onto the outer layer. Alternatively, as shown in FIG. 2, the inner layer 3 may be a continuous part of the envelope with the outer layer being deposited onto the inner layer.

An envelope of cathode ray tubes of the present invention serves as the vacuum enclosure and as a support for an electron gun 5. The body of the envelope may be made of any material with good X-ray absorbing properties and good optical transmission, such as lead-containing glass, or of a browning-resistant material, such as lead-free glass, depending on the particular version of the present invention. The electron gun in all version of the present invention serves to produce, focus and direct electron beams. The brief general description of envelopes and electron guns used in cathode ray tubes can be found in McGraw-Hill Encyclopedia of Science and Technology, vol. 2, pp 666–669 (5th edition, 1982), incorporated herein by reference. Composition of the lead-containing and lead-free glass which can be used in the manufacture of CRT envelopes is described, for example, in Rengan et al, Radiation Damage in Projection CRT Glass, Proceedings of the Society for Information Display, Vol. 26/1, 1985, p. 47, and Ishiyama et al, Browning of Glass by Electron Bombardment, Proceedings of Tenth International Congress on Glass, p. 4, hereby incorporated by reference. To produce visible images, the CRT screen must contain a layer of a luminescent material 6. The luminescent material is preferably deposited onto the inner layer of the screen. The luminescent layer is made of materials which can convert electrical energy to visible radiation, such materials as, for example, zinc orthosilicate, zinc silicate, calcium magnesium silicate and many others. The description of suitable luminescent materials and luminescence in cathode ray tubes can be found in McGraw-Hill Encyclopedia of Science and Technology, vol. 2, pp 669–671 (5th edition, 1982), incorporated herein by reference.

The outer layer of the screen is made of a material with good x-ray absorbing properties. Preferably, the outer layer is made of glass containing heavy metal oxides, such as for example lead oxide, bismuth oxide or silver oxide, most preferably lead oxide. The inner layer of the screen is made of material with good electron-absorbing properties which does not brown when bombarded with electron beams. Preferably, the inner layer is made of lead-free glass. Most preferably, the inner layer of the screen is made of lead-free glass with composition shown in Table 1, which indicates lower and higher limits of components.

TABLE 1

| Oxide | Weight Percent Composition | |
|---|---|---|
| | Low | High |
| $SiO_2$ | 40 | 70 |
| $B_2O_3$ | 10 | 25 |
| $Na_2O$ | 0 | 10 |
| $K_2O$ | 5 | 15 |
| $Li_2O$ | 0 | 10 |
| CaO | 0 | 10 |
| MgO | 0 | 10 |
| BaO | 6 | 12 |
| SrO | 0 | 10 |
| $ZrO_2$ | 0 | 5 |
| ZnO | 0 | 15 |
| $CeO_2$ | 0 | 5 |

It is preferred that the deposited layer, either inner or outer, be made out of glass with low fusion temperature, preferably below 700 degree C., most preferably at about 600 degrees C., and which has a similar thermal expansion properties to the glass which comprises the CRT body. Other glass compositions also may possess suitable properties.

According to one embodiment of the present invention, the body of the cathode ray tube envelope is made of glass containing sufficient lead oxide concentration to ensure the desired X-ray absorption. The lead-free glass having a composition described in Table 1 is then deposited as a glass coating to form the inner layer of the screen of the envelope. The thickness of this lead-free glass coating is preferably between 20 and 80 microns, more preferably between 30 and 60 microns, most preferably about 40 microns.

When used in an operational cathode ray tube, the envelope of the present invention reduces glass browning and substantially increases the lifetime of the CRT devices. The present invention may be used in various imaging devices, such as television receivers, computer monitors and other devices which employ cathode ray tubes. It also may be used in a variety of other applications, such as, for example, clear glass enamels, to import special optical, electrical and decorative properties to glass. Browning problems significantly reduced use of lead-containing glass, as well as use of any material with good X-ray absorbing properties which also causes browning. The present invention, by allowing use of such materials, constitutes a significant advance in the field of cathode ray tube manufacturing. At the same time, increase in the percentage of these metals in the CRT envelopes allows for better X-ray protection which is highly desirable. The present invention resolves the dilemma of having to chose between adequate X-ray protection and reduction in CRT useful life by allowing use of higher percentages of, for example, lead and bismuth CRT envelopes. Both reduction of browning and simultaneous protection from X-ray leakage becomes possible.

The glass composite and the glass composition of the present invention possesses such highly advantageous properties as transmission over the entire visible spectrum, low fusion temperatures, such as, for example, about 600 degrees C. for some of the versions of the present invention, ability to bond to ordinary glass without deformation of the glass substrate, and low stress in the bonding process.

Another advantage of the present invention is a substantially longer useful life of a cathode ray tube which utilized the present invention. Due to reduced browning, the CRT can be used for a substantially longer period of time.

The lead-free glass composition of the present invention is prepared by first mixing the raw materials in a suitable vessel, such as, for example a fused silica crucible or any vessel or manufacturing apparatus capable of withstanding temperatures associated with melting glass and glass materials, such as 1100 to 1200 degrees C. The raw materials, some of them optional, are described in Table 2.

TABLE 2

| Raw Material | Weight Percent Composition | |
| --- | --- | --- |
| | Low | High |
| Silica Oxide, $SiO_2$ | 35 | 70 |
| Boric anhydride | 10 | 25 |
| Potassium carbonate, $K_2CO_3$ | 5 | 20 |
| Barium carbonate, $BaCO_3$ | 5 | 20 |
| Zinc Oxide, ZnO | 0 | 20 |
| Sodium carbonate, $Na_2CO_3$ | 0 | 15 |
| Lithium carbonate, $Li_2CO_3$ | 0 | 10 |
| Strontium carbonate, $SrCO_3$ | 0 | 20 |
| Magnesium carbonate $MgCO_3$ | 0 | 10 |
| Calcium carbonate $CaCO_3$ | 0 | 15 |
| Cerium oxide, $CeO_2$ | 0 | 5 |
| Zirconium carbonate $ZrCO_3$ | 0 | 4 |

After the raw materials are mixed, the vessel is heated to melt the resulting mixture. This may be done at any suitable rate of heating, preferably at a rate of 300 degrees C. per hour. The melt is then maintained at least at the melting temperature, preferably from about 1050 to about 1150 degrees C., most preferably to 1100 degrees C. to assure throughout mixing of all of the components and to cause thermal decomposition of the carbonates. As Table 2 indicates, some of the raw materials are oxides, which are not likely to undergo gas-releasing chemical reactions, whereas some of the raw materials are carbonates, such as, for example barium carbonate, and they produce carbon dioxide and the corresponding oxide, such as, for example, barium oxide, upon heating for a period of time to the corresponding decomposition temperature. The raw materials are maintained at that temperature until a homogeneous glass melt results, preferably in the range of 0.5–2 h, more preferably for 1 hour. The resulting melt is then cooled to a temperature above the annealing point, preferably in the range of to 400 degrees C. to 600 degrees C., at a suitable high rate of cooling, preferably at the rate of 500 degrees C. per hour, and then cooled slower to room temperature, preferably at about 50 degrees C. per hour, producing the glass composition of the present invention.

This glass composition may be used to prepare the lead-free glass coating and the glass composite for use in cathode ray tubes. To create the glass coating on any substrate, preferably glass substrate, more preferably on the inner surface of the CRT envelope, the glass composition, or frit, described in Table 1 is first crushed and ground to reduce the desired particle size, preferably in the range of 200–325 mesh, most preferably to about 270 mesh. The ground glass is then mixed with a suitable solvent carrier, which includes but is not limited to alcohol carrier, such as ethanol, methanol, tertiary butanol, n-butanol, and others, most preferably isopropanol; or deposited onto a substrate by any suitable deposition method. The weight fraction of the glass material or frit in the mixture is preferably from 10 to 70%, most preferably at about 40%. The resulting mixture is then deposited onto the surface of a substrate, such as the inner surface of the CRT screen, with any suitable deposition method, such as dipping or spraying, preferably spraying, to form an assemblage defined above. The application of the frit to the substrate can also be done while the substrate is hot (300–550° C.) by use of electrostatic powder application, dusting, or spraying with a highly volatile vehicle. If the frit is applied to a cold substrate, it is then heated to a temperature intermediate between glass melting temperature and room temperature, preferably between 300 and 550 degrees C., most preferably to 450 degrees C., at a rapid rate of heating, preferably at a rate of between about 150 and about 250 degrees per hour, most preferably at about 200 degrees per hour. After the intermediate temperature is reached, the assemblage is annealed (maintained) for a period of time at this temperature, preferably up to 2 hours, most preferably for about 10–20 minutes, to promote uniformity in the assemblage. Following the annealing step, the assemblage is rapidly heated to a temperature sufficient to completely melt the frit without melting of the assemblage, preferably to between 650 and 750 degrees C., depending on the composition of glass used. Alternatively, the assemblage is rapidly heated to about 550 degrees C. at a suitable rapid rate of heating, preferably at about 600 degrees C. per hour, then removed from the oven or furnace to melt the frit with a flame torch. Once the frit is melted, the assemblage is returned to the furnace. When the frit is melted, the glass composite of the present invention is created. The resulting glass composite is rapidly cooled to a temperature intermediate between a frit melting temperature and a room temperature, preferably just above the annealing point of the assemblage, usually 300–550° C., at a rapid rate of cooling, and annealed (held) at the intermediate temperature for a period of time, preferably up to 2 hours, most preferably for about 10–20 minutes. The composite is then slowly cooled to room temperature, preferably at a rate of about 50 degrees per hour.

The following examples illustrate the present invention and are not intended to limit it in any way.

EXAMPLE 1

This example illustrates the preparation of a lead-free glass composition of the present invention.

The raw materials according to Table 3 were combined in a quartz crucible.

TABLE 3

| Raw Materials | Grams |
| --- | --- |
| Silica, Supersil 400 $SiO_2$ | 41.8 |
| Boric Anhydride, Fisher | 18.1 |
| Soda Ash, $Na_2CO_3$ | 1.5 |
| Potash, $K_2CO_3$ | 21.7 |
| Lithium carbonate, $Li_2CO_3$ | 8.4 |
| Calcium carbonate, $CaCO_3$ | 0.3 |
| Magnesium carbonate, $Li_2CO_3$ | 0.1 |
| Barium carbonate, $Li_2CO_3$ | 23.2 |
| Zinc oxide, ZnO | 20.4 |
| Cerium oxide, $CeO_2$ | 2.4 |
| Total | 117.9 |

The raw materials were mixed well and placed in an electric furnace. The raw materials mixture was then heated to 1100 degrees C. at a rate 300 degrees per hour. The resulting melt was maintained at 1100 degrees for 30 minutes to obtain the uniform melt. The melt was cooled to 500 degrees C. at a rate of 450 degrees per hour, then the cooling process was slowed and the solidifying glass was further cooled to room temperature at a rate of 50 degrees per hour to obtain the desired glass composition.

EXAMPLE 2

This example also illustrates the process for preparation of a lead-free glass composition of the present invention.

In a quartz crucible combine the following raw materials according to Table 4.

TABLE 4

| Raw Materials | % by Weight |
| --- | --- |
| Silica, Supersil 400 | 50 |
| Boric Anhydride, Fisher | 11 |
| Potassium carbonate | 12 |
| Barium carbonate | 6 |
| Zinc oxide | 1.2 |
| Sodium carbonate | 1.5 |
| Lithium carbonate | 5 |
| Cerium dioxide | 2.4 |
| Strontium carbonate | 10.9 |
| Total | 100% |

Mix the raw materials well and place a crucible in an electric furnace. Heat the raw materials mixture to 1050 degrees C. at a rate 350 degrees per hour. Maintain the resulting melt at 1100 degrees for 1.5 hours to obtain the uniform melt. Cool the melt to 450 degrees C. at a rate of 400 degrees per hour, then slow the cooling process and cool the solidifying glass to room temperature at a rate of 60 degrees per hour to obtain the desired glass composition.

EXAMPLE 3

This example illustrates the content of another lead-free glass composition of the present invention.

The content of one of the glass compositions of the present invention is shown in Table 5.

TABLE 5

| Oxide | Weight % |
| --- | --- |
| Silica oxide $SiO_2$ | 50.4 |
| Boron oxide, $B_2O_3$ | 18.8 |
| Sodium oxide, $Na_2O$ | 1.0 |
| Potassium oxide, $K_2O$ | 11.4 |
| Lithium oxide, $Li_2O$ | 8.3 |
| Calcium oxide, CaO | 0.2 |
| Magnesium oxide, MgO | 0.1 |
| Barium oxide, $B_2O$ | 8.5 |
| Zinc oxide ZnO | 0.4 |
| Cerium oxide, $CeO_2$ | 1.0 |

EXAMPLE 4

This working example illustrate the process for preparation of the glass composite of the present invention.

The glass composition, obtained by a process described in Example 1 was separated from the crucible, crushed and ground to reduce the particle size to below 200 mesh. The resulting glass powder was mixed with isopropanol in 1:3 ratio (1 part glass to 3 parts isopropanol), and the resulting suspension was sprayed onto a clean lead-containing glass substrate surface with an aerosol device to create a substrate/frit assemblage. The glass substrate covered with the isopropanol/glass mixture (the assemblage) was placed on a graphite block and placed into a furnace. The assemblage was heated to 450 degrees C. at a rate of 200 degrees per hour and held (annealed) at that temperature for 20 minutes to insure uniformity. Then the assemblage was rapidly heated to 700 degrees C. to melt the frit, cooled rapidly to 450 degrees, annealed for 30 minutes and then cooled slowly at a rate of 50 degrees per hour to room temperature, producing the glass composite.

What is claimed is:

1. A cathode ray tube envelope possessing improved anti-browning properties comprising a body capable of maintaining a vacuum when used in an operational cathode ray tube; said body including a screen capable of producing visible images, said screen comprising
    (i) an inner lead-free glass layer which comprises
        (a) between about 35 and about 70 percent by weight of silica oxide;
        (b) between about 10 and about 25 percent by weight of boron oxide;
        (c) between about 5 and about 15 percent by weight of potassium oxide;
        (d) between about 6 and about 12 percent by weight of barium oxide;
        (e) up to about 15 percent by weight of zinc oxide;
        (f) up to about 10 percent by weight of sodium oxide;
        (g) up to about 10 percent by weight of lithium oxide;
        (h) up to about 10 percent by weight of strontium oxide;
        (i) up to about 10 percent by weight of calcium oxide;
        (j) up to about 10 percent by weight of magnesium oxide;
        (k) up to about 5 percent by weight of cesium oxide;
        (l) up to about 5 percent by weight of zirconium oxide; and
    (ii) an outer lead-containing glass layer.

2. The envelope of claim 1 wherein said lead-free glass layer has thickness of up to 100 microns.

3. The envelope of claim 2 wherein said lead-free glass layer has thickness of between about 20 and about 80 microns.

4. The envelope of claim 3 wherein said lead-free glass layer has thickness of between about 30 and about 60 microns.

5. The envelope of claim 4 wherein said lead-free glass layer has thickness of about 40 microns.

6. A cathode ray tube possessing improved anti-browning properties, said tube comprising an electron gun and an envelope which comprises a body capable of maintaining a vacuum, said body enclosing the gun; said body including a screen capable of producing visible images, said screen comprising
    (i) an inner lead-free glass layer which comprises
        (a) between about 35 and about 70 percent by weight of silica oxide;
        (b) between about 10 and about 25 percent by weight of boron oxide;
        (c) between about 5 and about 15 percent by weight of potassium oxide;
        (d) between about 6 and about 12 percent by weight of barium oxide;
        (e) up to about 15 percent by weight of zinc oxide;
        (f) up to about 10 percent by weight of sodium oxide;
        (g) up to about 10 percent by weight of lithium oxide;
        (h) up to about 10 percent by weight of strontium oxide;
        (i) up to about 10 percent by weight of calcium oxide;
        (j) up to about 10 percent by weight of magnesium oxide;
        (k) up to about 5 percent by weight of cesium oxide;
        (l) up to about 5 percent by weight of zirconium oxide; and
    (ii) an outer lead-containing glass layer.

7. The tube of claim 6 wherein said lead-free glass layer has thickness of up to 100 microns.

8. The tube of claim 7 wherein said lead-free glass layer has thickness of between about 20 and about 80 microns.

9. The tube of claim 8 wherein said lead-free glass layer has thickness of between about 30 and about 60 microns.

10. The tube of claim 9 wherein said lead-free glass layer has thickness of about 40 microns.

11. A glass composite which may be used in a cathode ray tube said tube having a source of electrons, the composite comprising
   (1) a first layer which is comprised of lead-containing glass; and
   (2) a second layer which is comprised of lead-free glass wherein said second layer comprises
      (a) between about 35 and about 70 percent by weight of silica oxide;
      (b) between about 10 and about 25 percent by weight of boron oxide;
      (c) between about 5 and about 15 percent by weight of potassium oxide;
      (d) between about 6 and about 12 percent by weight of barium oxide;
      (e) up to about 15 percent by weight of zinc oxide;
      (f) up to about 10 percent by weight of sodium oxide;
      (g) up to about 10 percent by weight of lithium oxide;
      (h) up to about 10 percent by weight of strontium oxide;
      (i) up to about 10 percent by weight of calcium oxide;
      (j) up to about 10 percent by weight of magnesium oxide;
      (k) up to about 5 percent by weight of cesium oxide;
      (l) up to about 5 percent by weight of zirconium oxide, whereby the two-layered glass composite is formed such that the second layer may be positioned between the source of electrons and the first layer.

12. The glass composite according to claim 11 wherein said lead-free glass layer has thickness of up to about 100 microns.

13. The glass composite according to claim 12 wherein said lead-free glass layer has thickness of between about 20 and about 80 microns.

14. The glass composition according to claim 13 wherein said lead-free glass layer has thickness of between about 30 and about 60 microns.

15. The glass composition according to claim 14 wherein said lead-free glass layer has thickness of about 40 microns.

16. A cathode ray tube envelope possessing improved anti-browning properties comprising a body capable of maintaining a vacuum when used in an operational cathode ray tube, said body including a screen capable of producing visible images, said screen comprising
   (i) an inner layer wherein said inner layer is made of lead-free glass and is a continuous part of the body of the envelope; and
   (ii) an outer layer wherein said outer layer is made of lead-containing glass and is deposited on the inner layer.

* * * * *